US010382548B2

(12) United States Patent
Liu

(10) Patent No.: US 10,382,548 B2
(45) Date of Patent: Aug. 13, 2019

(54) CROSS-TERMINAL INPUT METHOD, APPARATUS AND SYSTEM

(71) Applicant: TENCENT TECHNOLOGY (SHENZHEN) COMPANY LIMITED, Shenzhen, Guangdong (CN)

(72) Inventor: Huazhong Liu, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 509 days.

(21) Appl. No.: 14/478,861

(22) Filed: Sep. 5, 2014

(65) Prior Publication Data

US 2015/0006682 A1 Jan. 1, 2015

Related U.S. Application Data

(63) Continuation of application No. PCT/CN2014/080996, filed on Jun. 27, 2014.

(30) Foreign Application Priority Data

Jun. 28, 2013 (CN) .......................... 2013 1 0269867

(51) Int. Cl.
  *H04L 29/08* (2006.01)
  *G06F 3/0488* (2013.01)
  *G06F 15/16* (2006.01)
(52) U.S. Cl.
  CPC ...... *H04L 67/1097* (2013.01); *G06F 3/04883* (2013.01); *G06F 3/04886* (2013.01); *G06F 15/16* (2013.01)
(58) Field of Classification Search
  None
  See application file for complete search history.

(56) References Cited

U.S. PATENT DOCUMENTS

2002/0090995 A1* 7/2002 Haga ....................... A63F 13/10
                                                                463/31
2004/0006627 A1* 1/2004 Sarfaty ................. G06F 3/0481
                                                                709/228

(Continued)

FOREIGN PATENT DOCUMENTS

CN      1524213 A     8/2004
CN    102546194 A     7/2012
CN    103338255 A    10/2013

OTHER PUBLICATIONS

State Intellectual Property Office of the P.R.China, "Patent Cooperation Treaty International Search Report for PCT/CN2014/080996", dated Oct. 9, 2014.

*Primary Examiner* — Viet D Vu
*Assistant Examiner* — James A Edwards
(74) *Attorney, Agent, or Firm* — Oblon, McClelland, Maier & Neustadt, L.L.P.

(57) ABSTRACT

The invention relates cross-terminal input method, apparatus and system. In certain embodiments, the method includes sending a request by a first terminal device to a server to acquire a transmission channel, when a triggering event is detected at the first terminal device; receiving interface information of the transmission channel from the server; repeatedly acquiring data transmitted from the server according to the interface information of the transmission channel; and updating output according to the acquired data. The cross-terminal input system includes first and second terminal devices. The first terminal device sends a request to a server to acquire a transmission channel, and receives interface information of the transmission channel. The second terminal device acquires the interface information, and uploads user input data to the transmission channel accordingly. Then, the first terminal device receives the user input data, and updates output with the received data.

24 Claims, 12 Drawing Sheets

(56) References Cited

U.S. PATENT DOCUMENTS

| | | | | |
|---|---|---|---|---|
| 2004/0087369 A1* | 5/2004 | Tanaka | .................... | A63F 13/12 463/42 |
| 2004/0199602 A1* | 10/2004 | Miyakoshi | .......... | G06F 3/03545 709/217 |
| 2006/0031359 A1* | 2/2006 | Clegg | .................... | H04L 51/12 709/206 |
| 2006/0167982 A1* | 7/2006 | Jawa | ....................... | H04L 12/66 709/203 |
| 2006/0282500 A1* | 12/2006 | Kiuchi | .................... | H04L 63/08 709/203 |
| 2009/0197676 A1* | 8/2009 | Baerlocher | ......... | G07F 17/3202 463/30 |
| 2009/0197682 A1* | 8/2009 | Sotoike | .................. | A63F 13/12 463/42 |
| 2010/0017470 A1* | 1/2010 | Hyoung | ................. | H04L 51/04 709/204 |
| 2011/0105226 A1* | 5/2011 | Perlman | ................. | A63F 13/12 463/30 |
| 2011/0242317 A1* | 10/2011 | Wengrovitz | ........... | H04N 7/181 348/143 |
| 2012/0309504 A1* | 12/2012 | Isozaki | ............... | G07F 17/3244 463/25 |
| 2013/0178281 A1* | 7/2013 | Ayyar | .................... | A63F 13/12 463/30 |
| 2014/0237015 A1* | 8/2014 | Bruins | .............. | H04W 52/0209 709/201 |

\* cited by examiner

CROSS-TERMINAL INPUT METHOD, APPARATUS AND SYSTEM

CROSS-REFERENCE TO RELATED APPLICATIONS

This application is a continuation application of International Patent Application No. PCT/CN2014/080996, entitled "CROSS-TERMINAL INPUT METHOD, APPARATUS AND SYSTEM", by Huazhong LIU, filed Jun. 27, 2014, which itself claims the priority to Chinese Patent Application No. 201310269867.2, entitled "Method and System for Simulating Real-Time Processing Of Virtual Scene", by Huazhong LIU, filed Jun. 28, 2013 in the State Intellectual Property Office of P.R. China, which are hereby incorporated herein in their entireties by reference.

FIELD OF THE INVENTION

The present invention relates generally to a cross-terminal input technology, and more particularly to a cross-terminal input method, a cross-terminal input apparatus and a cross-terminal input system.

BACKGROUND OF THE INVENTION

The background description provided herein is for the purpose of generally presenting the context of the present invention. Work of the presently named inventor, to the extent it is described in this background section, as well as aspects of the description that may not otherwise qualify as prior art at the time of filing, are neither expressly nor impliedly admitted as prior art against the present invention.

Input operation is one of the situations most commonly encountered by users of electronic devices. Commonly used input methods include keyboard, touch screen, mouse, microphone, and video cameras. However, as is well known, due to the limitation of the size, or design, some electronic devices may not have fully equipped input devices. For example, a conventional desktop computer may not have a touch screen. Some mobile phones and other portable electronic terminal devices do not have a full keyboard.

Therefore, a heretofore unaddressed need exists in the art to address the aforementioned deficiencies and inadequacies.

SUMMARY OF THE INVENTION

One of the objectives of the present invention is to provide a cross-terminal input method, a cross-terminal input apparatus and a cross-terminal input system to facilitate various input operations for the current terminal device using one or more external input terminal devices.

In one aspect of the present invention, the cross-terminal input method includes sending a request to a server to acquire a transmission channel when a first terminal device detects a triggering event; receiving interface information of the transmission channel transmitted from the server; repeatedly acquiring data transmitted from the server according to the interface information of the transmission channel, wherein the data is retrieved from a storage space corresponding to the transmission channel by the server; and updating output according to the acquired data.

In another aspect of the present invention, the cross-terminal input method includes receiving a request to acquire a transmission channel from a first terminal device, by a server; establishing the transmission channel, allocating a storage space for the transmission channel, and generating interface information of the transmission channel, according to the request to acquire the transmission channel; transmitting the interface information of the transmission channel to the first terminal device; receiving data uploaded from a second terminal device, and storing the received data in the storage space allocated for the transmission channel; and transmitting the data stored in the storage space to the first terminal device according to a request to acquire content.

In yet another aspect of the present invention, the cross-terminal input method includes sending a request to acquire a transmission channel to a server to request the server to establish a transmission channel, and receiving interface information of the transmission channel transmitted from the server, by a first terminal device; receiving the interface information of the transmission channel, and uploading data input by a user to the transmission channel according to the interface information, by a second terminal device; and repeatedly acquiring the data transmitted from the server, and updating output according to the acquired data, by the first terminal device.

In one aspect of the present invention, the cross-terminal input apparatus includes a transmission channel acquiring module configured to send a request to acquire a transmission channel to a server if a trigger event is detected at a first terminal device; an interface information receiving module configured to receive interface information of the transmission channel transmitted from the server; a content acquiring module configured to repeatedly acquire data transmitted from the server according to the interface information, wherein the data is retrieved from a storage space corresponding to the transmission channel by the server; and an outputting module configured to update output according to the acquired data.

In another aspect of the present invention, the cross-terminal input apparatus includes a transmission channel acquiring request receiving module configured to receive a request from a first terminal device to acquire a transmission channel at a server; a transmission channel establishing module configured to establish a transmission channel, allocate a storage space, and generate interface information of the transmission channel according to the request to acquire the transmission channel; an interface information transmitting module configured to transmit interface information of the transmission channel to the first terminal device; an input updating module configured to receive data uploaded from a second terminal device, and store the received data in the storage space; and a data transmitting module configured to transmit the data stored in the storage space to the first terminal device according to a request to acquire content from the first terminal device.

In one aspect of the present invention, the cross-terminal input system includes a first terminal device; and a second terminal device. The first terminal device is configured to send a request to a server to acquire a transmission channel and request the server to establish a transmission channel, and receive interface information of the transmission channel from the server. The second terminal device is configured to acquire the interface information of the transmission channel, and upload data input by a user at the second terminal device to the transmission channel according to the interface information of the transmission channel. The first terminal device repeatedly sends a request to acquire content through the transmission channel according to the interface information of the transmission channel, receives data transmitted from the server, and updates output according to the received data.

cross-terminal input method, the cross-terminal input apparatus and the cross-terminal input system make it possible to facilitate various input operations for a current terminal device using one or more external input terminal devices.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
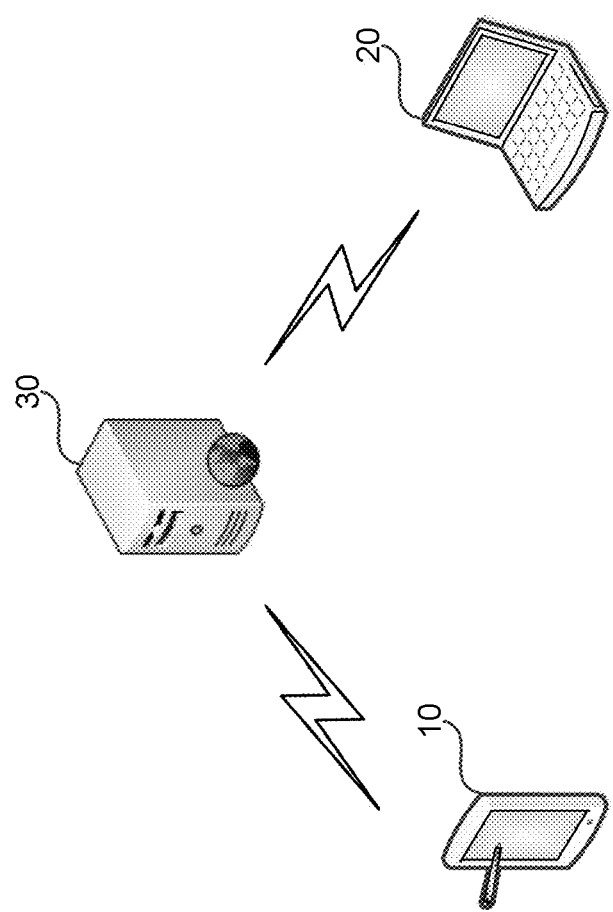
FIG. 1 is a schematic system for implementing cross-terminal input method, apparatus and system according to embodiments of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

As used herein, the term "server" refers to a system including software and suitable computer hardware that responds to requests across a computer network to provide, or help to provide, a network service.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the embodiments of the present invention in conjunction with the accompanying drawings in FIGS. 1-12. It should be understood that specific embodiments described herein are merely intended to explain the present invention, but not intended to limit the present invention. In accordance with the purposes of this invention, as embodied and broadly described herein, this invention, in one aspect, relates to cross-terminal input method, apparatus and system.

Referring now to FIG. 1, a cross-terminal input method is schematically shown according to embodiments of the present invention. In the exemplary embodiment, the cross-terminal input system includes a first terminal device 10, a second terminal device 20, and a server 30. The first terminal device 10 and the second terminal device 20 are communicatively connected through the server 30 over a network, allowing the first terminal device 10, the server 30, and the second terminal device 20 to communicate with each other.

In certain embodiments, the first terminal device 10, and the second terminal device 20 include, but are not limited to: desktop computers, notebook computers, tablet PCs, smart phones, personal digital assistants (PDA), smart watches, smart TVs, and any other similar electronic devices. The network includes, but is not limited to, the Internet, an intranet, local area network (LAN), or a wireless network. These wireless networks may include: mobile communication network, a Wi-Fi network, wireless LAN or MAN. The wireless communication networks may adopt a variety of communication standards, protocols and technologies, including, but being not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Wireless Fidelity (WiFi) (such as, the American Institute of Electrical and Electronics Engineers Standards IEEE802.11a, IEEE802.11b, IEEE802.11g and/or IEEE802.11n), Voice Over Internet Protocol (VoIP), Worldwide Interoperability for Microwave Access (W1-Max), other protocols for email, instant messaging and short message services, as well as any other suitable communication protocols, including those agreements currently under developments.

Figure 2:
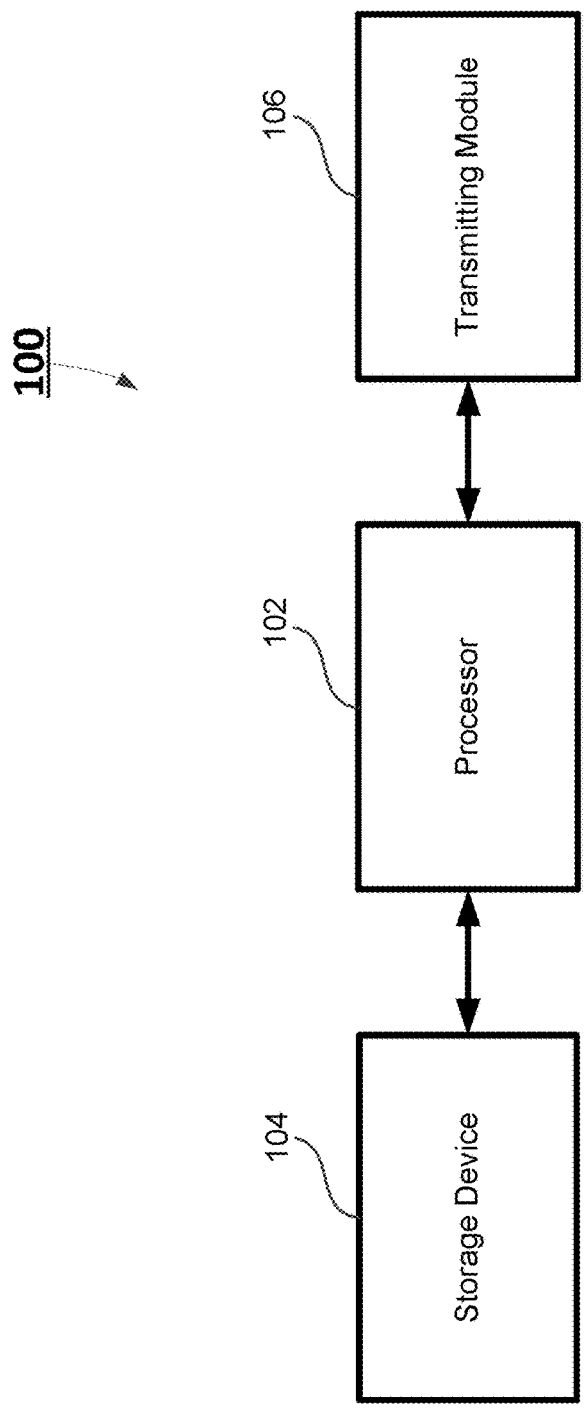
FIG. 2 is a schematic block diagram of an electronic device utilized in cross-terminal input method, apparatus and system according to embodiments of the present invention.

FIG. 2 shows a block diagram of an electronic device 100 used for the cross-terminal input system according to one embodiment of the present invention. The electronic device 100 includes one or more processors 102 (only one is shown in FIG. 2), a storage device 104 such as a memory, and a transmitting module 106. One skilled in the art understands that the electronic device 100 is not limited to the structure or block diagram shown in FIGS. 1 and 2. For example, the electronic device 100 may include more or less components, or different configurations from the ones shown in FIG. 2.

The storage device 104 is used to store software programs and modules, such as the programming instructions and software modules of the cross-terminal input method, the cross-terminal input apparatus and the cross-terminal input system of the present invention. The processor 102, by executing software program stored in the storage device 104, performs various functions and data processing applications to implement the cross-terminal input method. The storage device 104 may include high-speed random access memory and non-volatile memory, one or more magnetic storage devices, flash memory, or other non-volatile solid-state memory. In certain embodiments, the storage device 104 may include remotely located memory accessible to the processor 102 via the network, and/or cloud storage devices.

The network includes, but is not limited to, the Internet, an intranet, a local area network, a mobile communication network, and any combinations of these networks.

The transmitting module 106 is used to receive and/or send data via a wireless or wireless network. In certain embodiments, the transmitting module 106 includes a In one embodiment, the transmitting module 106 is a radio frequency (RF) module for wirelessly communicates with a client terminal device.

It should be appreciated that the electronic device 100 as shown in FIG. 2 can be utilized in the first terminal device 10 and the second terminal device 20 as shown in FIG. 1.

Figure 3:
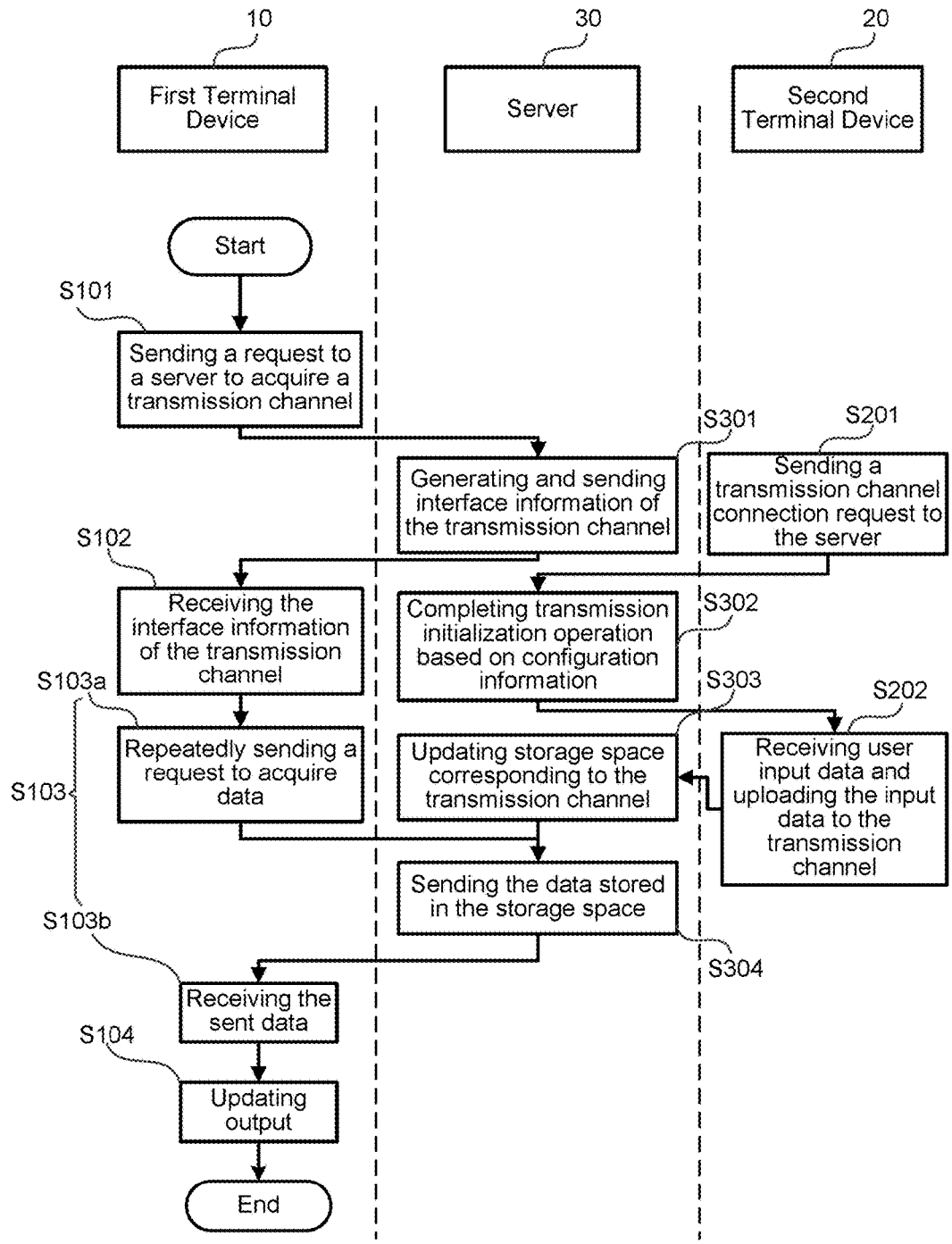
FIG. 3 is a schematic flowchart of a cross-terminal input method according to a first embodiment of the present invention.

FIG. 3 shows a schematic flowchart of a cross-terminal input method according to a first embodiment of the present invention. In the exemplary embodiment, the method includes the following steps:

At step S101, the first terminal device 10 sends a request to the server 30 to acquire a transmission channel, when a first terminal device 10 detects a triggering event.

Figure 4:
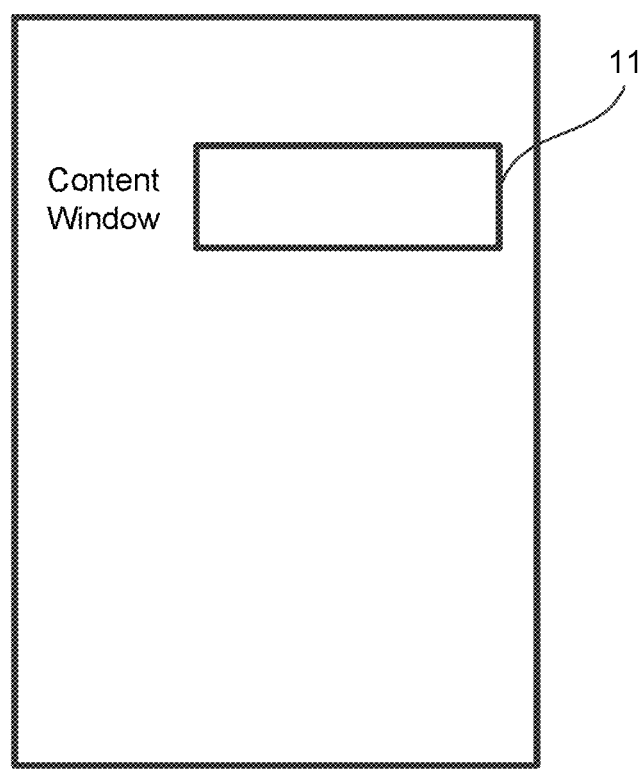
FIG. 4 is a schematic interface of an application program operating in a first terminal device according to one embodiment of the present invention.

FIG. 4 is a schematic interface of an application program operating in the first terminal device 10 according to one embodiment of the present invention. The interface of the first terminal device 10 has a content window 11. Under normal circumstances, if a user touches the content window 11, or pointing a mouse to the content window 11, the content window 11 enters an input state. For example, the content window 11 displays a virtual keyboard, or a handwriting input interface for the user to enter information using the virtual keyboard, or the handwriting input text box. In one embodiment, this input process is defined as a local input of the first input terminal 10. In certain embodiments, other terminal devices can also be used to input information to the first terminal device 10 (i.e., cross-terminal input). The cross-terminal input may be triggered by a triggering event. In one embodiment, holding the content window 11 longer than a predetermined time period by a user can trigger the above-disclosed cross-terminal input operation.

In another embodiment, pressing and holding a key (e.g., a camera button) longer than a predetermined time period when the content window 11 is activated can trigger the above-disclosed cross-terminal input operation.

In yet another embodiment, if a predetermined hand gesture is detected when the content window 11 is activated, the hand gesture can trigger the above-disclosed cross-terminal input operation. The hand gestures may include hand gesture operations based on flat-screen touch technologies, or accelerometer-based space motion gestures.

In a further embodiment, if a predetermined voice command is detected when the content window 11 is activated, the voice command can trigger the above-disclosed cross-terminal input operation.

In should be appreciated that the cross-terminal input triggering events are not limited by the examples described above. One skilled in the art may use any other input methods to trigger a cross-terminal input operation. In other words, the trigger event may include: key touch events, voice control commands, touch gestures, spatial gestures, and any combination of these operations.

In certain embodiments, once a cross-terminal input operation is triggered, the first terminal device 10 registers for a transmission channel with the server 30 and sends a request to the server 30 to obtain the transmission channel.

At step S102, the server 30 transmits interface information of the transmission channel transmitted to the first terminal device 10.

Referring back to FIG. 3, after step S101, at the server 30, the server 30 performs step S301 to generate a transmission channel and transmit it to the first terminal device 10. Specifically, after receiving the request to obtain the transmission channel, the server 30 establishes the transmission channel, allocates a storage space for the transmission channel, generate a unique identifier (i.e., identification information), and associate the unique identifier with the transmission channel. The allocated storage space can be implemented in a database, local files of the server 30, a distributed cache, or a cloud server.

At the server 30, after the transmission channel is established, the server 30 also generates interface information for the transmission channel.

In certain embodiments, the interface information is a uniform resource locator (URL), and the server 30 generates the URL based on the unique identifier. The URL includes at least the unique identifier, and other information that can be used to obtain the unique identifier through conversion or decoding. The URL can be transmitted by the form of texts, or images such as two-dimensional image codes. When a two-dimensional image is used, the server 30 also generates the corresponding two-dimensional coded image based on the URL or unique identifier. This two-dimensional coded image should include the above URLs directly, uniquely identifies, or through conversion to obtain additional information to resolve the above URL or unique identifier.

Once the interface information of the transmission channel is generated, the interface information is transmitted back to the first terminal device 10 by the server 30. Furthermore, since the network address of the server 30 remains unchanged, the interface information can be only the unique identifier as described above. The first terminal device 10 can also be used to generate the URL or a two dimensional code as the interface information of the transmission channel, based on the unique identifier and predetermined parameters.

At step S103, the first terminal device 10 repeatedly acquires the data transmitted from the server 30 according to the interface information of the transmission channel, where the data is retrieved from the storage space corresponding to the transmission channel by the server 30.

In certain embodiments, step S103 includes step S103a to send repeatedly a request to acquire the data from the server 30, and step S103b to receive the data transmitted from the server 30.

In certain embodiments, after the server 30 transmits the interface information, the registration of transmission channel process is completed. The first terminal device 10 performs step S103 to request data in a predetermined interval. For example, the first terminal device 10 sends a data request to the server 30 every half a second or every second. The data request is directed to the URL discussed above.

Accordingly, the server 30 performs step S304 to transmit the data stored in the storage space to the first terminal device 10. That is, the server 30 retrieves the data from the storage space corresponding to the transmission channel and transmits the data to the terminal device 10.

The data stored in the storage space is entered through the second terminal device 20, and the process of entering the data can be found in the subsequent description.

In one embodiment, the server 30 transmits the data/content at the request of the first terminal device 10. It should be understood that the data transfer is not restricted in this manner alone. For example, the server 30 may also push data to the first terminal device 10.

At step S104, the first terminal device 10 updates the output according to the data received from the server 30.

Figure 5:
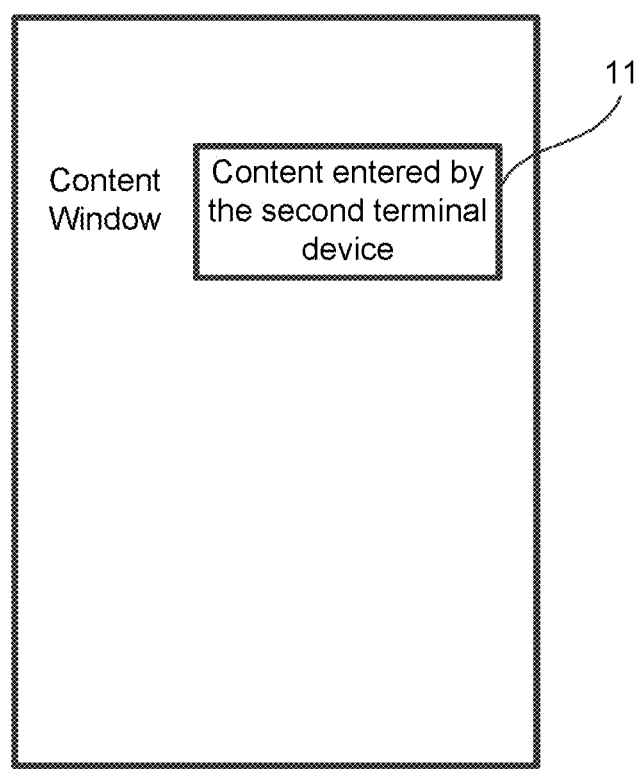
FIG. 5 is an updated interface of the application program as shown in FIG. 4.

FIG. 5 shows an updated output, where the content input at the second terminal device 20 is displayed on the content window 11 of the first terminal device 10.

Referring back to FIG. 3, after step S301 is completed, the transmission channel is established and the second terminal device 20 can send a request to the server 30 to establish connection between the second terminal device 20 and the server 30.

In one embodiment, the second terminal device 20 performs step S201 to send a request to establish transmission channel connection between the second terminal device 20 and the server 30.

As described above, after the server 30 established the transmission channel, the interface information of the transmission channel is transmitted to the first terminal device 10. The interface information of the transmission channel is not sent to the second terminal device 20. Thus, the second terminal device 20 needs to acquire the interface information of the transmission channel before any transmission channel connection. Therefore, the second terminal device 20 needs to acquire the interface information of the transmission channel (not shown in FIG. 3) and send request to the server 30 to establish the transmission channel connection according to the acquired interface information of the transmission channel.

In one embodiment, the second terminal device 20 acquires the interface information through user input. The user can obtain the interface information from the first terminal device 10, and then enter the interface information at the second terminal device 20.

In one embodiment, the second terminal device 20 acquires the interface information by scanning a two dimensional coded image displayed on the first terminal device 10.

In one embodiment, the second terminal device 20 acquires the interface information by receiving a text message or instant message from the first terminal device 10.

Once the second terminal device 20 receives the interface information of the transmission channel, the second terminal device 20 can send a request to the server 30 to establish transmission channel connection.

Accordingly, the server 30 performs step S302 to complete an initialization operation according to configuration information.

Specifically, the initialization operation includes receiving a request from the second terminal device 20 to establish transmission channel connection; retrieving configuration information of the transmission channel corresponding to the request, the configuration information such as identification information, a maximum number of terminal devices allowed to be connected; and sending an identification request, information relating to the maximum number of terminal devices allowed to be connected, and information of a type of user input to the second terminal 20.

In one embodiment, if the transmission channel passes verification, the server 30 may send verification instructions to the second terminal device 20, or redirect the second terminal device 20 to a verification web page. The second terminal device 20 then displays the verification input interface, receives identification information from the user input and sends the identification information to the server 30 for verification.

If the number of requested connections to the transmission channel exceeds the maximum number of terminal devices allowed to be connected, the server 30 sends an error message back to second terminal device 20 indicating the number of connections to the transmission channel has exceeded the maximum number of terminal devices allowed to be connected.

If the second terminal device 20 receives information of the type of user input, then the second terminal device 20 adjust the input interface according to the information of the type of user input. For example, if the first terminal device 10 adopts a handwriting input in the configuration information of the transmission channel, the second terminal device 20 automatically switches to the handwriting input interface. If the first terminal device 10 adopts a drawing input in the configuration information of the transmission channel, the second terminal device 20 automatically switches to the drawing interface.

Once the initialization operation is completed, the server 30 is available to receive data input from the second terminal device 20. In certain embodiments, based on different configuration, the initialization operation may be skipped by not performing any operations. In other words, in some embodiments, step S201 and step S302 can be omitted.

Referring to FIG. 3 again, step S202 may be performed in the second terminal device 20 to receive user input data and upload the received user input data to the transmission channel. The user input data includes, but is not limited to, text, graphics, voice, video, and any combination of these information forms. The step S202 may be triggered by a predetermined trigger condition.

In one embodiment, the second terminal device 20 sends the received user input data in every half a second or every second interval to the transmission channel.

In one embodiment, the second terminal device 20 sends the user input data to the transmission channel whenever the user input data is detected or the user input data is changed.

In response to the uploaded user input data, the server 30 performs step S303 to update the storage space corresponding to the transmission channel, and store the uploaded user input data to the storage space.

According to the embodiments described above, the second terminal device 20 can perform input step for the first terminal device 10. The advantages of the cross-terminal input method include:

1. resolving problems such as the first terminal device 10 does not have an input device, the first terminal device 10 does not have a complete input device, or the input through the first terminal device 10 is not efficient. For example, a mobile electronic terminal device may not have a complete keyboard, or the input efficiency is very low. With the cross-terminal input method, the text input can be performed on a desktop computer with complete keyboard;

2. obtaining content of a document in the second terminal device 20 by cut and paste function at the first terminal device 10; and 3. receiving user input data from the second terminal device 20 at the first terminal device 10 in real-time by repeatedly requesting user input data at the server 30.

Figure 6:
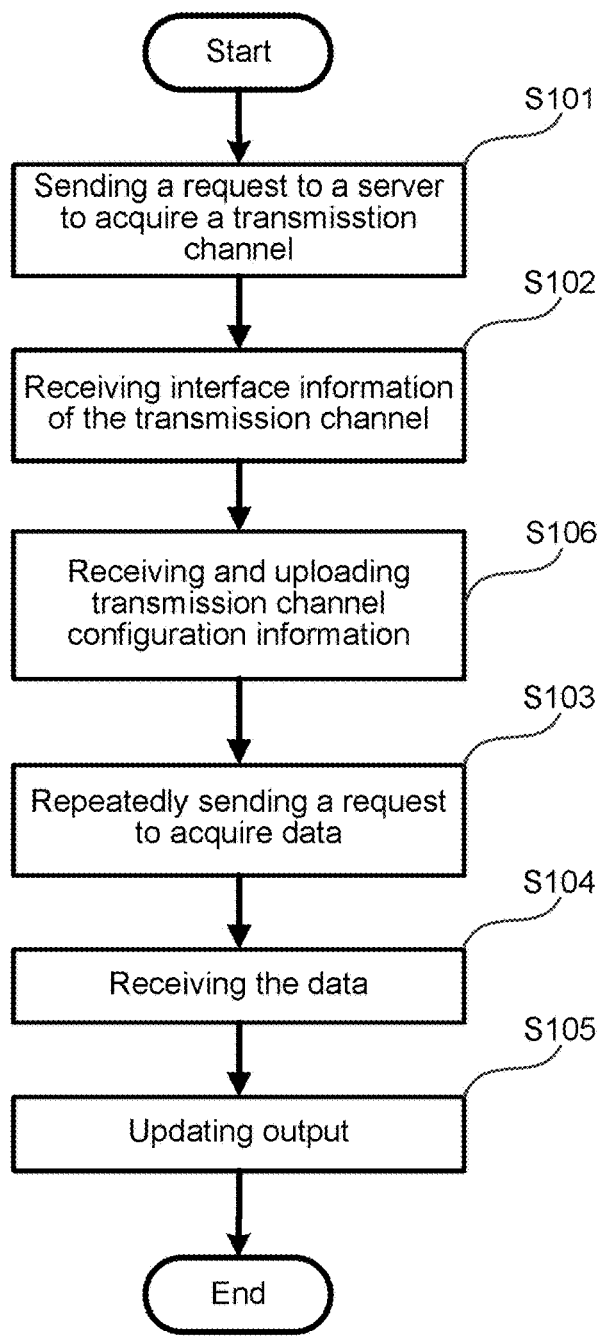
FIG. 6 is a flowchart of a cross-terminal input method according to a second embodiment of the present invention.

Referring now to FIG. 6, a flowchart of a cross-terminal input method is shown according to a second embodiment of the present invention. In this embodiment, the cross-terminal input method is similar to the method of the first embodiment. In addition, the cross-terminal input also include step S106 to receive and upload configuration information.

In the exemplary embodiment, step S106 is performed between the step S102 and the step S103. Specifically, the first terminal device 10 displays the configuration information interface of the transmission channel, and allows the user to enter configuration information of the transmission channel, such as, whether an identification information is necessary, the maximum number of terminal devices allowed to be connected, and information types of the user input. The first terminal device 10 then sends the configuration information to the server 30. The information types of the user input include: text input in different languages, image or picture input, and voice or audio input.

In certain embodiments, step S106 does not have to be performed between the step S102 and the step S103. The step S106 can be performed concurrently with the step S101. After the server 30 establishes the transmission channel, the first terminal device 10 may include the configuration information in the request to acquire the transmission channel.

According to the invention, the cross-terminal input method provides a more flexible configuration of the transmission channel, and meets the demands of different cross-terminal input.

Figure 7:
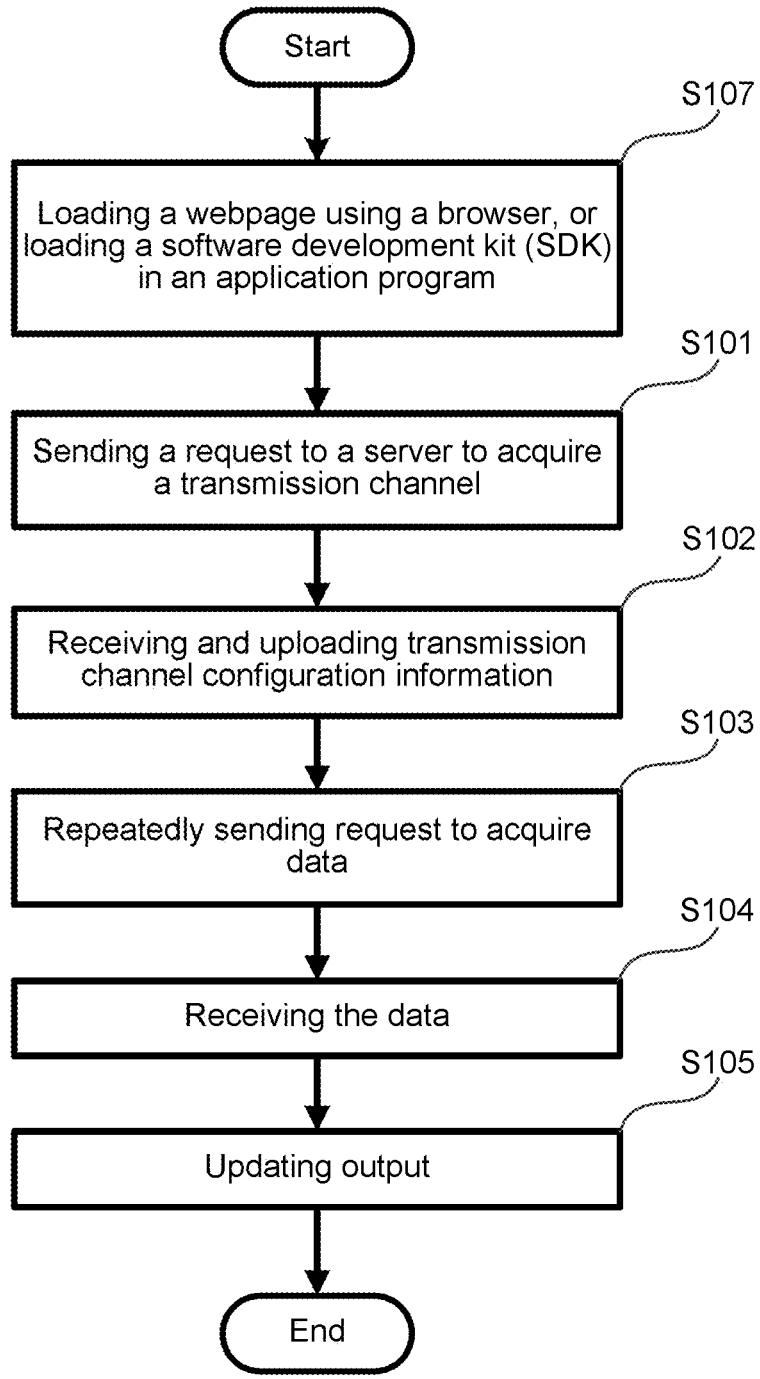
FIG. 7 is a flowchart of a cross-terminal input method according to a third embodiment of the present invention.

Referring now to FIG. 7, a flowchart of a cross-terminal input method is shown according to a third embodiment of the present invention. The cross-terminal input method is similar to the method of the first embodiment. In addition, prior to step S101, the first terminal device 10 performs step S107 to load a web page through a web browser, or load a software development kit (SDK) in an application program. The web page includes at least a script used to monitor triggering event in conjunction with the software development kit. Once a triggering event is detected, then, all steps S101 through S105 are performed accordingly.

In certain embodiments, an input operation can be implemented through a web page, or other terminal functionality of the application program to improve the efficiency and convenience of the input operation.

Figure 8:
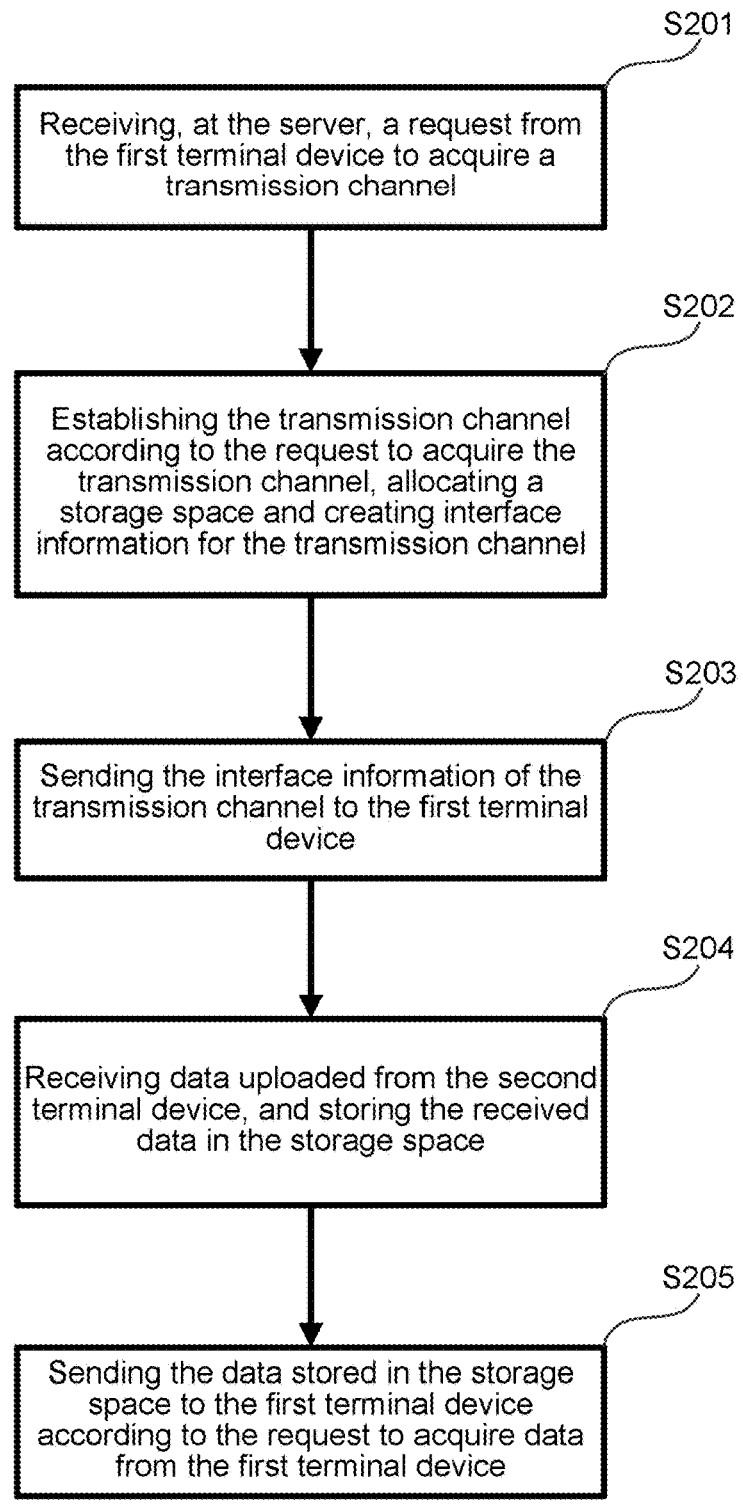
FIG. 8 is a flowchart of a cross-terminal input method according to a fourth embodiment of the present invention.

Referring now to FIG. 8, a flowchart of a cross-terminal input method is shown according to a fourth embodiment of the present invention. The cross-terminal input system is implemented in the server 30 as shown in FIG. 1. The cross-terminal input method includes following steps:

At step S201, the server 30 receives a request from the first terminal device 10 to acquire a transmission channel.

At step S202, the server 30 establishes the transmission channel according to the request, allocates storage space for the transmission channel, and generates interface information of the transmission channel.

At step S203, the server 30 sends the interface information of the transmission channel to the first terminal device 10.

At step S204, the server 30 receives user input data uploaded by the second terminal device 20 through the transmission channel, and stores the received user input data in the storage space allocated to the transmission channel.

At step S205, the server 30 sends the user input data in the storage space to the first terminal device 10 according to requests from the first terminal device 10 to obtain user input data.

The detail of implementing the method described here can be found in the description of the cross-terminal input method in FIG. 3.

According to this embodiment, the server 30 receives the user input data from the second terminal device 20 in real-time, and sends the received user input data to the first terminal device 10 in real-time. Therefore, the first terminal device 10 accepts input from the second terminal device 20.

Figure 9:
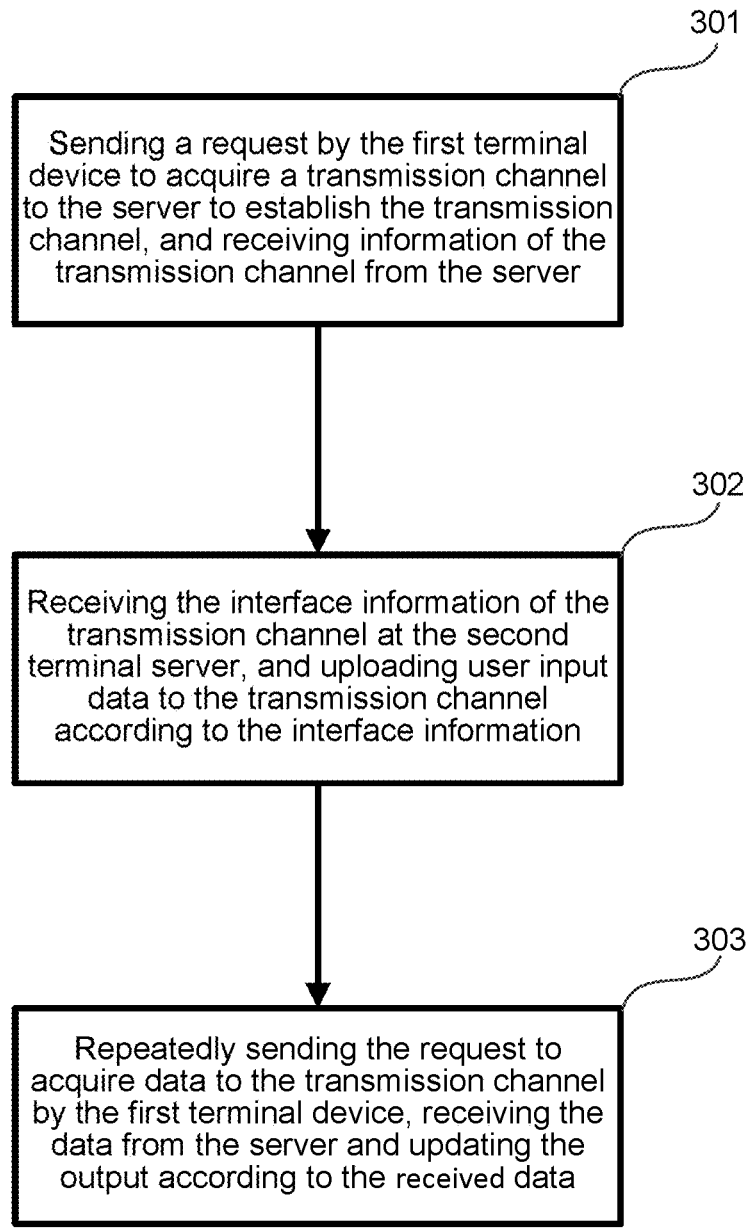
FIG. 9 is a flowchart of a cross-terminal input method according to a fifth embodiment of the present invention.

Referring now to FIG. 9, a flowchart of a cross-terminal input method is shown according to a fifth embodiment of the present invention. As shown in FIG. 9, the cross-terminal input method includes the following steps:

At step 301, the first terminal device 10 send a request to the server 30 to request the server 30 to establish a transmission channel, and send interface information of the established transmission channel.

At step 302, the second terminal device 20 acquires the interface information of the transmission channel, and uploads user input data to the transmission channel according to the interface information of the transmission channel.

At step 303, the first terminal device 10 repeatedly sends requests to the transmission channel to the acquire data according to the interface information, receives the data sent from the server 30, and updates the output according to the received data.

In the exemplary embodiment, the server 30 receives the user input data from the second terminal device 20 in real-time, and sends the received user input data to the first terminal device 10 also in real-time. Therefore, the first terminal device 10 accepts input from the second terminal device 20.

Figure 10:
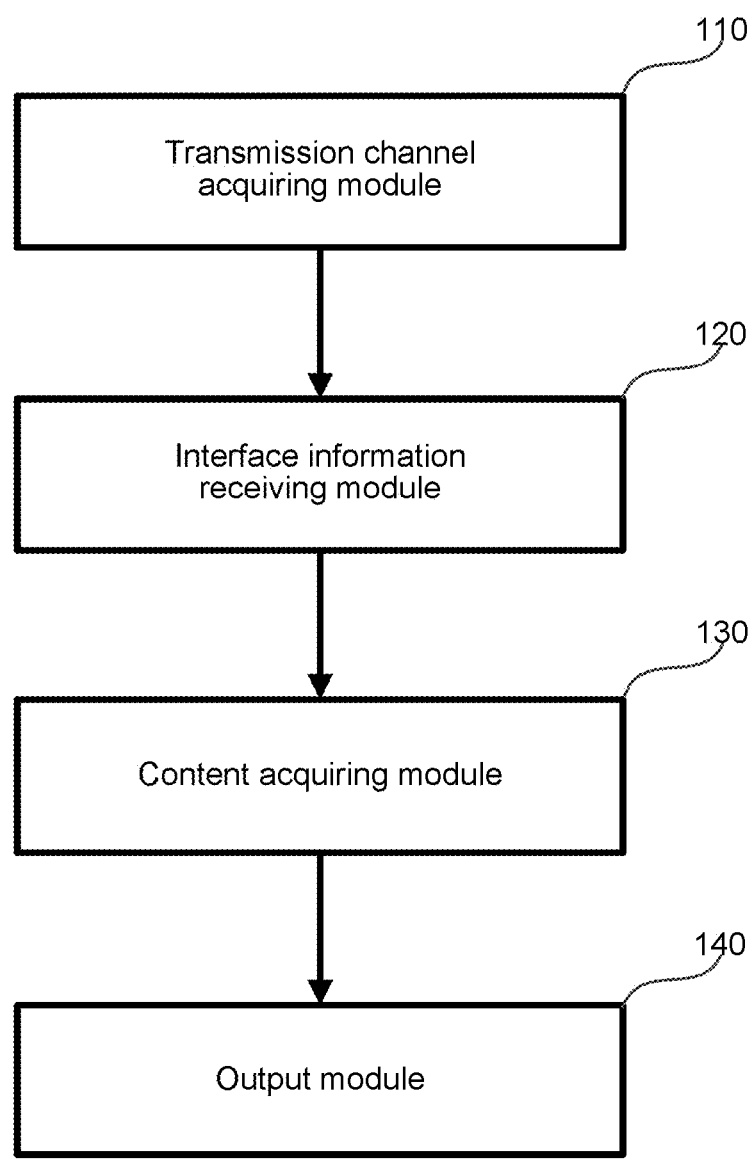
FIG. 10 is a schematic block diagram of a cross-terminal input apparatus according to one embodiment of the present invention.

Referring now to FIG. 10, a schematic block diagram of a cross-terminal input apparatus is shown according to one embodiment of the present invention. The cross-terminal input apparatus has a transmission channel acquiring module 110, an interface information receiving module 120, a content acquiring module 130, and an output module 140.

In certain embodiments, the transmission channel acquiring module 110 is used to send a request to the server 30 to establish a transmission channel after the first terminal device 10 detects a triggering event. The triggering event includes, but is not limited to, a key pressing event, a voice control command, touch screen event, spatial gesture operation event, or any combination of these events.

The interface information receiving module 120 is used to receive interface information of the transmission channel established from the server 30. After the server 30 receives a request from the first terminal device 10 to establish the transmission channel, the server 30 establishes the transmission channel, allocates storage space for the transmission channel and generates interface information of the transmission channel. The interface information of the transmission channel includes: a URL, or a two-dimensional coded image.

The content acquiring module 130 is used to repeatedly sending requests to the server 30 to send the data stored in the storage space allocated to the transmission channel according to the interface information. For example, if the interface information is a URL, the first terminal device 10 sends requests to the server in a predetermined interval to acquire data from the server 30. If the interface information is a two-dimensional coded image, the server 30 decodes the two-dimensional coded image to obtain the URL or a unique identifier of the transmission channel, and then acquires the data sent from the server 30.

The output module 140 is used to update the output according to the received data. As shown in FIG. 5, the data or text entered at the second terminal device 20 is sent by the server 30 and is displayed in the content window 11 of the first terminal device 10.

In the exemplary embodiment shown in FIG. 5, the input is text input. It should appreciated that the input information type is not limited to the text input. Other inputs such as graphics input, audio or voice input, or video input can also be used.

The cross-terminal input apparatus shown in FIG. 10 can be used to provide various inputs to the first terminal device 10 from the second terminal device 20. The advantages of the cross-terminal input apparatus shown in FIG. 10 include:

1. resolving problems such as the first terminal device 10 does not have an input device, the first terminal device 10 does not have a complete input device, or the input through the first terminal device 10 is not efficient. For example, a mobile electronic terminal device may not have a complete keyboard, or the input efficiency is very low. With the cross-terminal input method, the text input can be performed on a desktop computer with complete keyboard;

2. obtaining content of a document in the second terminal device 20 by cut and paste function at the first terminal device 10; and 3. receiving user input data from the second terminal device 20 at the first terminal device 10 in real-time by repeatedly requesting user input data at the server 30.

Figure 11:
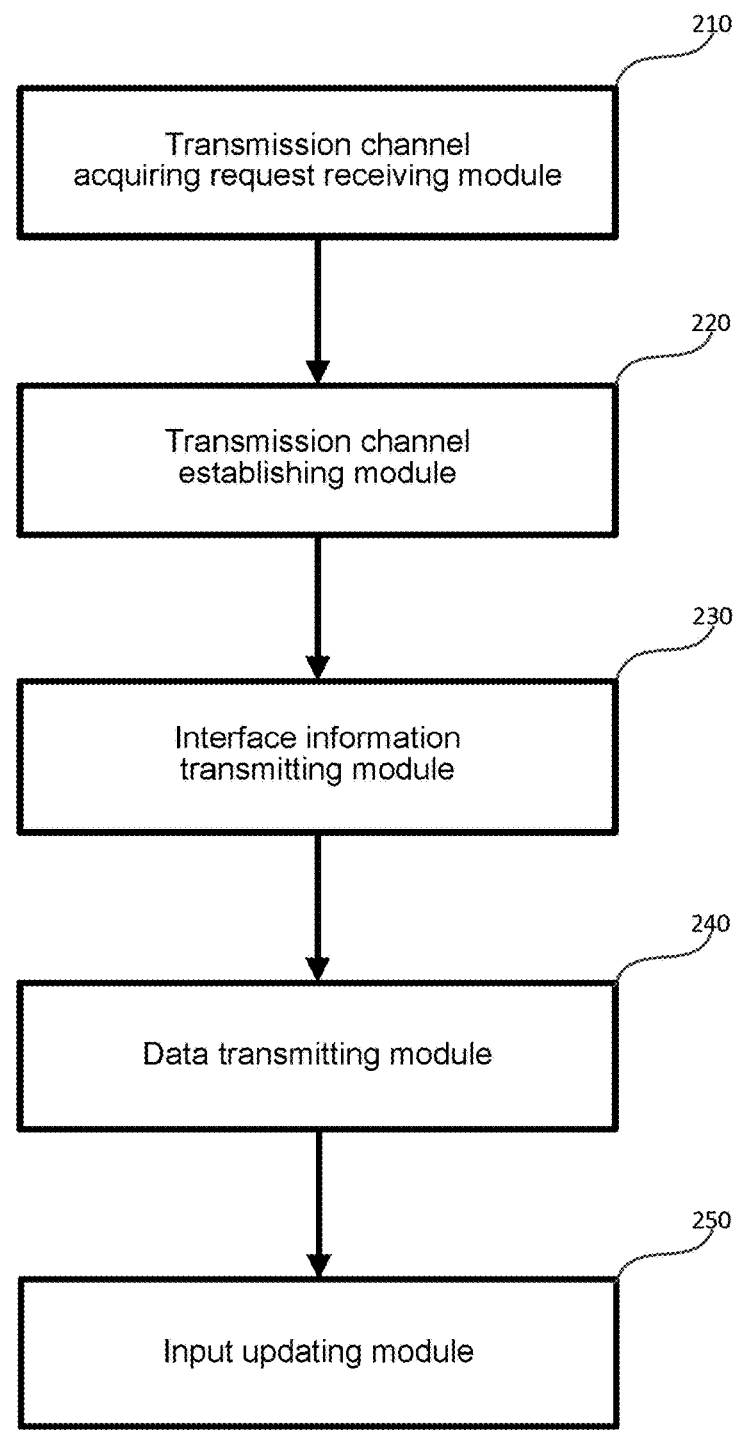
FIG. 11 is a schematic block diagram of a cross-terminal input apparatus according to another embodiment of the present invention.

Referring now to FIG. 11, a schematic block diagram of a cross-terminal input apparatus is shown according to another embodiment of the present invention. The cross-terminal input apparatus includes a transmission channel acquiring request receiving module 210, a transmission channel establishing module 220, an interface information transmitting module 230, a data transmitting module 240, and an input updating module 250.

In certain embodiments, the transmission channel acquiring request receiving module 210 is used to receive a request from the first terminal device 10 to establish a transmission channel. The transmission channel establishing module 220 establishes the transmission channel, allocates storage space for the transmission channel established, and generates interface information of the transmission channel according to the request.

The interface information transmitting module 230 is used to send the interface information of the transmission channel back to the first terminal device 10. The data transmitting module 240 is used to send the data in the storage space of the transmission channel back to the first terminal device 10. The input updating module 250 is used to receive the user input data uploaded to the transmission channel from the second terminal device 20, and store the received user input data in the storage space corresponding to the transmission channel.

The cross-terminal input apparatus shown in FIG. 11 can be used to provide various inputs to the first terminal device 10 from the second terminal device 20.

Figure 12:
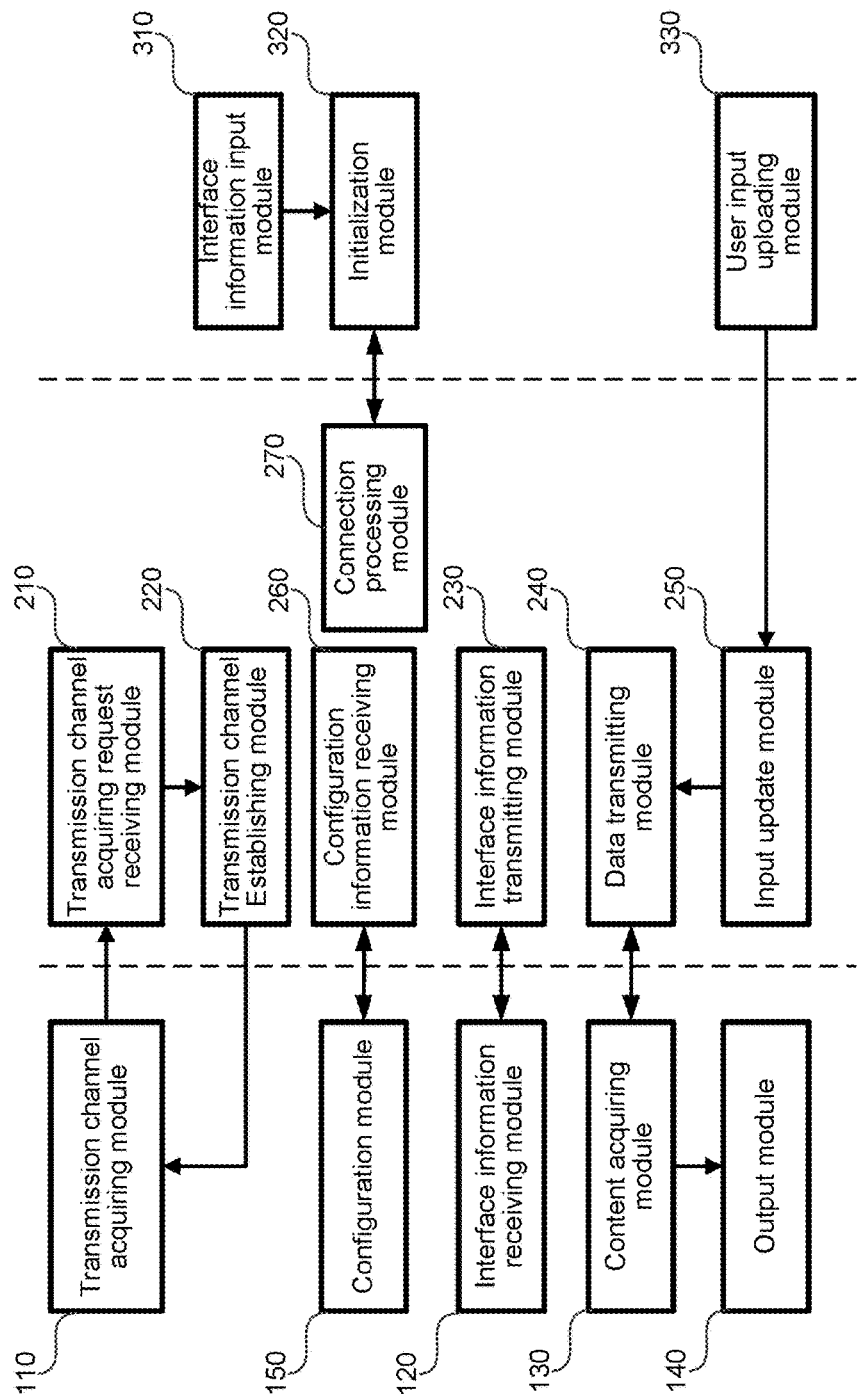
FIG. 12 is a schematic block diagram of a cross-terminal input system according to yet another embodiment of the present invention.

Referring now to FIG. 12, a schematic block diagram of a cross-terminal input system is shown according to yet another embodiment of the present invention. In certain embodiments, the cross-terminal input system includes all modules shown in FIG. 3. In addition, the cross-terminal input system includes a configuration module 150, a configuration information receiving module 260, an interface information input module 310, an initialization module 320, a connection processing module 270, and a user input upload module 330.

The configuration module 150 is used at the first terminal device 10 to receive configuration information of the transmission channel through user input, and upload the received configuration information of the transmission channel to the server 30.

The configuration information receiving module 260 is used to receive the configuration information of the transmission channel uploaded from the first terminal device 10, and upload the received configuration information of the transmission channel to the server 30.

The interface information input module 310 is used by the second terminal device 20 to allow a user of the second terminal device 20 to input interface information of the transmission channel.

The initialization module 320 is used by the second terminal device 20 to send request to connect to the transmission channel. If the initialization module 320 receives identification request from the server 30, then the initialization module 320 acquires identification information from the user, and sends the acquired identification information to the server 30 for verification. If the number of requested connections to the transmission channel exceeds the maximum number of terminal devices allowed to be connected, the server 30 sends an error message back to the initialization module 320 indicating the number of connections to the transmission channel has exceeded the maximum number of terminal devices allowed to be connected. The request to connect is therefore denied.

If the initialization module 320 receives information of the type of user input, then the initialization module 320 adjusts the input interface according to the received information of the type of user input.

The connection processing module 270 is used by the server 30 to receive a connection request from the initialization module 320 of the second terminal device 20. The connection processing module 270, then sends identification request, information relating to the number of connected terminal devices exceeding a maximum number of terminal devices allowed to be connected, and information of the type of user input, back to the second terminal device 20.

If the configuration information includes an identification request, then the connection processing module 270 sends an identification request to the second terminal device 20, and performs identification according to the identification information uploaded from the second terminal device 20. The connection processing module 270 can be used to receive identification information from the second terminal device 20. If the identification information from the second terminal device 20 matches the identification information of the transmission channel, then the connection processing module 270 associates the second terminal device 20 with the transmission channel.

The user input upload module 330 is used to receive user input data, and upload the received user input data to the server 30, through the input updating module 250 of the server 30.

In another embodiment, a cross-terminal input system is shown in FIG. 1. The cross-terminal input system includes a first terminal device 10, a second terminal device 20 and a server 30.

The first terminal device 10 is used to send a request to the server 30 to acquire a transmission channel such that the server 30 establishes the transmission channel, and receive interface information of the established transmission channel from the server 30.

The second terminal device 20 is used to acquire the interface information of the established transmission channel, and upload user input data to the transmission channel according to the acquired interface information of the transmission channel.

In addition, the first terminal device 10 repeatedly sends request to the server 30 to send data to the first terminal device 10 according to the acquired interface information, and updates output according to the data sent from the server 30.

Detailed description of other modules of cross-terminal input system shown in FIG. 12 not described here can be found in foregoing descriptions. The cross-terminal input system allows a user to enter information to the first terminal device 10 from the second terminal device 20.

In another aspect, the present invention relates to a non-transitory computer readable storage medium. The non-transitory computer readable storage medium stores computer-executable instructions. When executed by one or more processors of a cross-terminal input system, these computer-executable instructions cause the cross-terminal input system to perform the cross-terminal input methods as disclosed above. The non-transitory computer storage medium includes, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of a cross-terminal input, comprising:
sending, by first circuitry of a first terminal device, a request to a server to acquire a unidirectional transmission channel when the first circuitry of the first terminal device detects a trigger event performed by a user of the first terminal device that indicates a second terminal device is to function as an input device for a local input window on the first terminal device via the unidirectional transmission channel, the local input window on the first terminal device being configured to receive data input at the first terminal device, the data input at the first terminal device being received via an input interface of the second terminal device in real-time when the first terminal device lacks an input interface capable of handling a type of user input for inputting the data input;
receiving, by the first circuitry of the first terminal device, server Uniform Resource Locator (URL) information of the unidirectional transmission channel from the server;
receiving, by second circuitry of the second terminal device, the server URL information of the unidirectional transmission channel from the first circuitry of the first terminal device;
connecting, by the second circuity of the second terminal device, to the unidirectional transmission channel based on the received server URL information to provide the data input at the second terminal device to the first terminal device;
uploading, by the second circuitry of the second terminal device, the data input at the second terminal device to the server associated with the server URL information of the unidirectional transmission channel received by the second circuitry of the second terminal device;
receiving, by the server, the data input uploaded by the second terminal device;

storing, by the server, the received data input uploaded by the second terminal device in a storage space corresponding to the unidirectional transmission channel, by the server;

receiving, by the first circuitry of the first terminal device, the stored data input uploaded by the second terminal device from the server; and updating, by the first circuitry of the first terminal device, a display of the local input window on the first terminal device to include the stored data input uploaded by the second terminal device and received from the server.

2. The method according to claim 1, further comprising:

generating a two-dimensional code according to the server URL information of the unidirectional transmission channel, wherein the receiving, by the second circuitry of the second terminal device, the server URL information includes acquiring and decoding the two-dimensional code at the second terminal device to obtain the server URL information of the unidirectional transmission channel.

3. The method according to claim 1, further comprising:

generating the server URL information of the unidirectional transmission channel and allocating the storage space for the unidirectional transmission channel, according to the request by the first terminal device to acquire the unidirectional transmission channel, by the server.

4. The method according to claim 1, further comprising, at the server:

receiving a transmission channel connection request from the second terminal device;

acquiring configuration information of the unidirectional transmission channel corresponding to the transmission channel connection request; and transmitting an identification request, information relating to a maximum number of terminal devices allowed to be connected, and information of the type of user input to the second terminal device according to the configuration information of the unidirectional transmission channel.

5. The method according to claim 4, further comprising, at the second terminal device:

acquiring identification information input by the user when the second terminal device receives the identification request, and sending the identification information to the server for verification;

displaying error information when a number of terminal devices requested to be connected exceeds the maximum number of terminal devices allowed to be connected; and adjusting the input interface of the second terminal device to match the type of user input when the second terminal receives the information of the type of user input.

6. The method according to claim 1, wherein the receiving the stored data input uploaded by the second terminal device from the server comprises:

repeatedly sending a request to acquire content through the unidirectional transmission channel; and receiving the stored data input uploaded by the second terminal device from the server.

7. A method of cross-terminal input, comprising:

receiving a request to acquire a unidirectional transmission channel from a first terminal device, by circuitry of a server, wherein the request indicates that a user of the first terminal device requests a second terminal device to function as an input device for a local input window on the first terminal device via the unidirectional transmission channel, the local input window on the first terminal device being configured to receive data input at the first terminal device, the data input at the first terminal device being received via an input interface of the second terminal device in real-time when the first terminal device lacks an input interface capable of handling a type of user input for inputting the data input;

establishing the unidirectional transmission channel, allocating a storage space for the unidirectional transmission channel, and generating server Uniform Resource Locator (URL) information of the unidirectional transmission channel, according to the request to acquire the unidirectional transmission channel;

transmitting, by the circuitry of the server, the server URL information of the unidirectional transmission channel to the first terminal device;

receiving, by the circuitry of the server, the data input at the second terminal device after the second terminal device receives the server URL information from the first terminal device and connects to the unidirectional transmission channel based on the received server URL information, the data input at the second terminal device being uploaded from the second terminal device to the circuitry of the server associated with the server URL information transmitted to the first terminal device and received by the second terminal device;

storing the received data input uploaded by the second terminal device in the storage space allocated for the unidirectional transmission channel; and transmitting the stored data input uploaded by the second terminal device to the first terminal device for display in the local input window on the first terminal device.

8. The method according to claim 7, further comprising:

receiving identification information from the second terminal device; and associating the unidirectional transmission channel with the second terminal device when the identification information received from the second terminal device corresponds to identification information of the unidirectional transmission channel.

9. The method according to claim 7, further comprising:

receiving configuration information of the transmission channel from the first terminal device, wherein the configuration information includes identification information, a maximum number of terminal devices allowed to be connected, and the type of user input; and transmitting an identification request, information relating to the maximum number of terminal devices allowed to be connected, and information of the type of user input to the second terminal device.

10. The method according to claim 9, further comprising:

receiving a request to establish a connection to the unidirectional transmission channel from the second terminal device before receiving the data input uploaded to the transmission channel from the second terminal device;

transmitting the identification request to the second terminal device when the configuration information includes the identification information, and performing verification according to identification information uploaded from the second terminal device; and receiving the data input uploaded from the second terminal device to the transmission channel and storing the received data input in the storage space when the verification is successful.

11. A method of cross-terminal input, comprising:
sending, by circuitry of a first terminal device, a request to acquire a transmission channel to a server when a trigger event is performed by a user of the first terminal device that indicates a second terminal device is to function as an input device for a local input window on the first terminal device via a unidirectional transmission channel, the local input window on the first terminal device being configured to receive data input at the first terminal device, the data input at the first terminal device being received via an input interface of the second terminal device in real-time when the first terminal device lacks an input interface capable of handling a type of user input for inputting the data input;
receiving server Uniform Resource Locator (URL) information of the unidirectional transmission channel from the server;
receiving the data input at the second terminal device from the server, the second terminal device uploads the data input at the second terminal device to the server after the second terminal device receives the server URL information from the first terminal device and connects to the unidirectional transmission channel based on the server URL information; and
updating a display of the local input window on the first terminal device to include the received data input uploaded by the second terminal device and received from the server, by the circuitry of the first terminal device.

12. A cross-terminal input apparatus, comprising:
circuitry configured to
send a request to acquire a unidirectional transmission channel to a server when a trigger event is performed by a user of the cross-terminal input apparatus that indicates a second terminal device is to function as an input device for a local input window on the cross-terminal input apparatus via the unidirectional transmission channel, the local input window on a first terminal device being configured to receive data input at the first terminal device, the data input at the first terminal device being received via an input interface of the second terminal device in real-time when the first terminal device lacks an input interface capable of handling a type of user input for inputting the data input;
receive server Uniform Resource Locator (URL) information of the unidirectional transmission channel from the server;
receive the data input at the second terminal device from the server, the second terminal device uploads the data input at the second terminal device to the server after the second terminal device receives the server URL information from the first terminal device and connects to the unidirectional transmission channel based on the server URL information; and
update a display of the local input window on the first terminal device to include the received data input uploaded by the second terminal device and received from the server.

13. A cross-terminal input apparatus, comprising:
circuitry configured to
receive a request from a first terminal device to acquire a unidirectional transmission channel, wherein the request indicates that a user of the first terminal device requests a second terminal device to function as an input device for a local input window on the first terminal device via the unidirectional transmission channel, the local input window on the first terminal device being configured to receive data input at the first terminal device, the data input at the first terminal device being received via an input interface of the second terminal device in real-time when the first terminal device lacks an input interface capable of handling a type of user input for inputting the data input;
establish the unidirectional transmission channel, allocate a storage space for the unidirectional transmission channel, and generate server Uniform Resource Locator (URL) information of the unidirectional transmission channel, according to the request to acquire the unidirectional transmission channel;
transmit the server URL information of the unidirectional transmission channel to the first terminal device;
receive the data input at the second terminal device, the data input at the second terminal device being uploaded from the second terminal device to the cross-terminal input apparatus after the second terminal device receives the server URL information from the first terminal device and connects to the unidirectional transmission channel based on the server URL information;
store the received data input uploaded by the second terminal device in the storage space allocated for the unidirectional transmission channel; and
transmit the stored data input uploaded by the second terminal device to the first terminal device for display in the local input window on the first terminal device.

14. The cross-terminal input apparatus according to claim 13, wherein the circuitry is configured to
receive configuration information of the unidirectional transmission channel from the first terminal device, wherein the configuration information includes identification information, a maximum number of terminal devices allowed to be connected, and the type of user input; and
transmit an identification request, information relating to the maximum number of terminal devices allowed to be connected, and information of the type of user input to the second terminal device.

15. The cross-terminal input apparatus according to claim 14, wherein the circuitry is configured to
receive identification information from the second terminal device; and
associate the unidirectional transmission channel with the second terminal device when the identification information received from the second terminal device corresponds to the identification information of the unidirectional transmission channel.

16. The cross-terminal input apparatus according to claim 14, wherein the circuitry is configured to
receive a request to establish a connection to the unidirectional transmission channel from the second terminal device before receiving the data input uploaded to the transmission channel from the second terminal device;
transmit the identification request to the second terminal device when the configuration information includes the identification information, and perform verification according to identification information uploaded from the second terminal device; and receive the data input uploaded from the second terminal device to the transmission channel and store the received data input in the storage space when the verification is successful.

17. The cross-terminal input apparatus according to claim 13, wherein the second terminal device scans the server URL information from the first terminal device.

18. The cross-terminal input apparatus according to claim 13, wherein the circuitry is configured to
receive the request from the first terminal device, receive the data input at the second terminal device, and transmit the stored data input uploaded by the second terminal device via the Internet.

19. A cross-terminal input system, comprising:
a server;
a first terminal device; and
a second terminal device, wherein
the first terminal device includes first circuitry that is configured to
send a request to the server to acquire a unidirectional transmission channel when the first circuitry of the first terminal device detects a trigger event performed by a user of the first terminal device that indicates the second terminal device is to function as an input device for a local input window on the first terminal device via the unidirectional transmission channel, the local input window on the first terminal device being configured to receive data input at the first terminal device, the data input at the first terminal device being received via an input interface of the second terminal device in real-time when the first terminal device lacks an input interface capable of handling a type of user input for inputting the data input, and
receive server Uniform Resource Locator (URL) information of the unidirectional transmission channel from the server;
the second terminal device includes second circuitry that is configured to
receive the server URL information of the unidirectional transmission channel that is received by the first circuitry of the first terminal device,
connect to the unidirectional transmission channel based on the received server URL information to provide the data input at the second terminal device to the first terminal device, and
upload the data input at the second terminal device to the server associated with the server URL information of the unidirectional transmission channel received by the second circuitry of the second terminal device;
the server includes third circuitry that is configured to
receive the data input uploaded by the second terminal device, and
store the received data input uploaded by the second terminal device in a storage space corresponding to the unidirectional transmission channel; and the first circuitry of the first terminal device is configured to
receive the stored data input, uploaded by the second terminal device, from the server, and
update a display of the local input window on the first terminal device to include the received uploaded data input.

20. The cross-terminal input system according to claim 19, wherein
a two-dimensional code is generated according to the server URL information of the transmission channel; and
the second circuitry of the second terminal device is configured to acquire and decode the two-dimensional code to obtain the server URL information of the unidirectional transmission channel at the second terminal device.

21. The cross-terminal input system according to claim 20, wherein the third circuitry of the server is configured to generate the server URL information of the unidirectional transmission channel and allocate the storage space corresponding to the unidirectional transmission channel, according to the request to acquire the unidirectional transmission channel.

22. The cross-terminal input system according to claim 19, wherein the third circuitry of the server is configured to
receive a transmission channel connection request from the second terminal device;
acquire configuration information of the transmission channel corresponding to the transmission channel connection request; and
transmit an identification request, information relating to a maximum number of terminal devices allowed to be connected, and information of the type of user input to the second terminal device according to the configuration information of the unidirectional transmission channel.

23. The cross-terminal input system according to claim 22, wherein the second circuitry of the second terminal device is configured to
acquire identification information input by the user when the second terminal device receives the identification request, and send the identification information to the server for verification;
display information when a number of terminal devices requested to be connected exceeds the maximum number of terminal devices allowed to be connected; and
adjust the input interface to match the type of user input when the second terminal receives the information of the type of user input.

24. The cross-terminal input system according to claim 19, wherein the first circuitry of the first terminal device is configured to
repeatedly send a request to acquire content through the unidirectional transmission channel, and
receive the stored data input uploaded by the second terminal device from the server.

* * * * *